UNITED STATES PATENT OFFICE 2,184,255

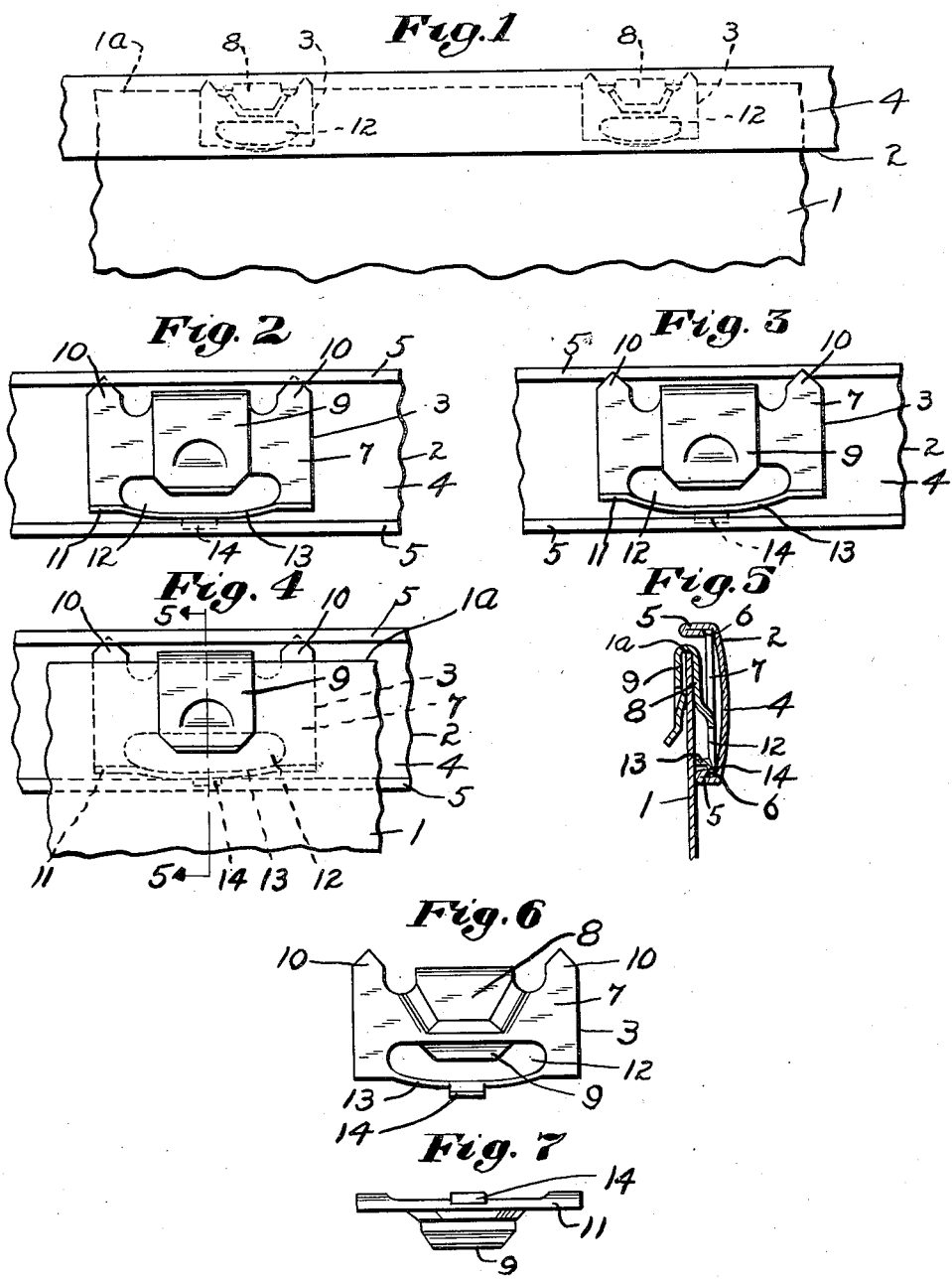

MOLDING AND LIKE FASTENER AND INSTALLATION THEREOF

Joseph Kral, Cambridge, Mass., assignor to United-Carr Fastener Corporation, Cambridge, Mass., a corporation of Massachusetts Application March 3, 1937, Serial No. 128,772

5 Claims. (Cl. 24—73)

My invention aims to provide improvements in fastener secured installations and fasteners for the same.

In the drawing, which illustrates a preferred embodiment of my invention:

Figure 1 is a front view of a portion of an installation embodying my invention;

Fig. 2 is a rear view of a portion of a molding strip with my improved fastener in engagement with the same;

Fig. 3 is a view similar to that of Fig. 2 showing the method by which my fastener is engaged with the strip;

Fig. 4 is a rear view showing a molding strip secured to a support by means of my fastener member;

Fig. 5 is a section taken along the line 5—5 of Fig. 4;

Fig. 6 is a front view of my fastener member per se; and

Fig. 7 is a bottom view of the fastener shown in Fig. 6.

The particular parts chosen to illustrate the use of my improved fastener include a molding strip, such as is now frequently used on the bodies of automobiles and elsewhere, and a supporting member.

The particular embodiment of my invention as illustrated in the drawing includes a supporting member 1, which may be a portion of the sheet metal body of an automobile, and a molding strip 2 secured to the support 1 by means of my improved fastener member 3.

The molding strip 2 which I have chosen for purposes of illustrating my invention is of substantially channel-shaped cross-section having a front wall 4 and upstanding spaced side walls 5 which may be of slightly different lengths, as shown in Fig. 5. The longer of the side walls is disposed beyond a free edge 1ª of the support member 1 in my preferred installation, as most clearly shown in Fig. 5. Extensions of the free ends of the side walls 5 are folded back in adjacent relation to opposed inside surfaces of the walls and terminated in spaced relation to the rear surface of the wall 4 so as to provide shoulders or ledges 6 (Fig. 5) facing the wall 4 and extending longitudinally of the side walls of the molding for the entire length thereof.

The fastener member 2 which secures the strip to a support is somewhat similar in its general shape to a fastener for the same purpose which is known in the art, but the last-mentioned fastener is constructed in such a way that it must rely upon the natural resiliency of the side walls of the strip for attachment to the strip whereas the fastener 3, which is the subject of my present invention, is yieldable in itself enabling it to be sprung into attached position within the side walls of a strip without the necessity of having to depend on the flexibility of the side walls for effecting this purpose.

The fastener member illustrated by Figs. 1–7 is preferably made of one piece of sheet metal and has a body portion 7 of substantially rectangular shape. A laterally projecting bulge 8 is pressed from the body 7 adjacent one end and between lateral sides for a reason to be described. As a means for securing the fastener to the support 1 I have provided a spring arm portion 9 integral with a free edge of the bulge 8 and adapted to engage material adjacent an edge 1ª of the support so as to clamp the fastener to the support. Attaching portions, which are preferably in the form of integral lugs 10—10, extend from the same end of the body 7 as the arm 9 and are disposed on opposite sides of the arm. The lugs 10—10 lie in substantially the same plane as the body 7 and are preferably pointed at their outermost ends to aid in preventing longitudinal movement of the fastener relative to the strip after the fastener has been once secured to the strip. A flange 11 is provided integral with an edge of the body 7 at the opposite end of the body from that having the lugs 10—10. The flange 11 extends in substantially perpendicular relation to the body 7 and in my preferred form is disposed along the entire length of the side. An opening 12 is provided in the body 7 adjacent a portion 13 of the flange 11. This opening is for the purpose of rendering the adjacent flange portion 13 yieldable so that the portion 13 may expand and contract relative to the lugs 10—10, as will be described. In my preferred form the yieldable portion 13 of the flange is bowed slightly away from the line of that end of the body with which the flange is integral, as shown in Figs. 2, 3 and 5. An attaching portion in the form of an integral lug 14 extends from the lower surface of the yieldable portion 13 of the flange in a direction away from the body 7, as most clearly shown in Fig. 5.

In my preferred way of assembling the parts of the installation I first secure the fasteners to the molding strip. This action is accomplished by first engaging the lug 14 behind the shoulder 6 provided on the inside of the shorter side wall 5 in the manner shown in Fig. 3. It will be noticed that when the fastener is in the aforesaid first position for attachment to the strip, portions at the free ends of the lugs 10—10 extend beyond the inner surface of the folded back portion extending from the free end of the longer wall 5, as shown in Fig. 3. The fastener is now moved in the direction of the lug 14 thereby compressing the yieldable portion 13 of the flange and at the same time pressing upon the fastener so as to enable the lugs 10—10 to engage behind the shoulder 6 provided on the inside of the longer wall 5. After this action the yieldable flange portion 13 expands toward normal position and the fastener is firmly engaged with the strip, as shown in Fig. 2. In the last step in my assembling process the spring arm 9 is slipped over the free edge of the support 1 to clamp the support against the bulged portion 8, as shown in Fig. 5. It will be noticed that the bulged portion 8 serves to space laterally the body 7 from the support 1 so that the trim strip, which in my preferred installation extends beyond the edge 1a of the support (Figs. 1 and 5), is maintained in proper spaced position relative to the support.

Thus it will be seen that by constructing my fastener member in the manner illustrated and described it is possible to attach quickly and easily any desired number of fasteners to a trim strip along its length by a lateral approaching movement without causing any distortion of the walls of the strip during the attaching process.

Although I have illustrated and described a preferred embodiment of my invention, I do not wish to be limited thereby as the scope of my invention is best defined in the following claims.

I claim:

1. A fastener member having a body portion, an arm extending from one end of said body, said arm having a portion disposed on one side of said body and adapted to cooperate with said body for securing said member to a support, an attaching portion extending from the same end of said body as said arm, an attaching portion at the other end of said body and resilient means spaced from said body enabling at least one of said attaching portions to yield relative to the other whereby said fastener member may be sprung into engagement with a cooperating device.

2. A fastener member having a body portion, an arm extending from said body, said arm having a portion disposed on one side of said body and adapted to cooperate with said body for securing said member to a support, an attaching portion extending from one end of said body, a portion of material at the other end of the body spaced from said body and yieldable relative to said attaching portion and an attaching portion extending from said yieldable material whereby said attaching portions may be sprung into engagement with a cooperating device.

3. A fastener member having a body portion, an arm extending from said body, said arm having a portion disposed on one side of said body and adapted to cooperate with said body for securing said member to a support, at least one attaching portion extending from one end of said body, said body having an opening disposed entirely within the marginal edges thereof rendering a portion of the material at the opposite end of the body from said first end yieldable relative to said attaching portion, and an attaching portion extending from the yieldable material of said end, said attaching portions adapted to be sprung into engagement with a cooperating device.

4. A fastener member having a body portion, an arm extending from said body, said arm having a portion disposed on one side of said body and adapted to cooperate with said body for securing said member to a support, at least one attaching portion extending from one end of said body, an integral flange extending from the other end in a plane substantially perpendicular to the plane of said body, said flange being joined to said body at its opposed ends and spaced from said body intermediate its ends whereby a portion of said flange is yieldable relative to said attaching portion, and an integral attaching portion extending from said yieldable portion of said flange, the attaching portions at opposed ends of said body adapted to be sprung into engagement with a cooperating socket device.

5. A fastener member having a body portion, a pair of attaching portions extending from one end of said body portion in substantially the plane thereof, said body having a laterally-projecting bulge between said attaching portions and adjacent an end of said body, a spring arm extending from the free edge of said bulge, said arm having a portion disposed on one side of said body and adapted to cooperate with said body for securing said member to a support, an integral flange extending from the opposite end of said body from that having said attaching portions in a plane substantially perpendicular to the plane of said body, said flange being joined to said body at its opposed ends and spaced from said body intermediate its ends whereby a portion of said flange is yieldable relative to said attaching portions and an integral lug extending from the yieldable portion of said flange, said attaching portions and said lug adapted to be sprung into engagement with a cooperating socket device.

JOSEPH KRAL.